(12) United States Patent
Ashenbrenner et al.

(10) Patent No.: US 8,254,992 B1
(45) Date of Patent: Aug. 28, 2012

(54) WIRELESS DOCKING SYSTEM AND PAIRING PROTOCOL FOR MULTIPLE DOCK ENVIRONMENTS

(75) Inventors: Robert Ashenbrenner, Austin, TX (US); Ronald Harter, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 916 days.

(21) Appl. No.: 11/868,702

(22) Filed: Oct. 8, 2007

(51) Int. Cl.
*H04B 1/38* (2006.01)

(52) U.S. Cl. ..... 455/557; 455/41.2; 455/41.3; 455/63.1; 455/67.13; 455/517; 711/5

(58) Field of Classification Search ................. 455/557, 455/41.2, 41.3, 63, 67.3, 517; 711/5
See application file for complete search history.

(56) References Cited

U.S. PATENT DOCUMENTS

| | | | |
|---|---|---|---|
| 5,930,368 A | 7/1999 | Hocker et al. | |
| 5,964,847 A * | 10/1999 | Booth et al. | 710/1 |
| 6,081,536 A * | 6/2000 | Gorsuch et al. | 370/468 |
| 6,359,872 B1 | 3/2002 | Mahany et al. | |
| 6,600,734 B1 | 7/2003 | Gernert et al. | |
| 6,678,253 B1 | 1/2004 | Heath, Jr. et al. | |
| 6,778,824 B2 | 8/2004 | Wonak et al. | |
| 6,915,135 B1 * | 7/2005 | McKee et al. | 455/456.6 |
| 7,076,270 B2 | 7/2006 | Jaggers et al. | |
| 7,089,034 B1 | 8/2006 | Schornack et al. | |
| 7,110,789 B1 | 9/2006 | Curtiss et al. | |
| 7,165,725 B2 | 1/2007 | Casey | |
| 7,190,954 B2 | 3/2007 | Wonak et al. | |
| 7,231,481 B2 | 6/2007 | Scott et al. | |
| 7,471,651 B2 * | 12/2008 | Mahany et al. | 370/310 |
| 7,787,821 B2 * | 8/2010 | Hamaguchi | 455/41.1 |
| 2003/0172217 A1 * | 9/2003 | Scott et al. | 710/303 |
| 2004/0148445 A1 | 7/2004 | Lee et al. | |
| 2005/0246470 A1 | 11/2005 | Brenner | |
| 2006/0026326 A1 * | 2/2006 | Hunt et al. | 710/303 |
| 2006/0133290 A1 | 6/2006 | Lindoff et al. | |
| 2006/0172715 A1 | 8/2006 | Carballo et al. | |
| 2007/0079048 A1 * | 4/2007 | Starr et al. | 711/5 |
| 2008/0195788 A1 * | 8/2008 | Tamir et al. | 710/303 |

OTHER PUBLICATIONS

"How Terminal Services Works," Microsoft Corp., Mar. 28, 2003, 14 pages.
Stokes, "PCI Express: An Overview," Jul. 7, 2004, 20 pages.
Eyler, "An Overview of ping," Linux Journal, Oct. 10, 2005, 4 pages.
Williams, "LDAP Whitepaper," PROplus Systems, Inc., Mar. 2000, 4 pages. Wood, "UWB Standards," WiMedia Alliance White Paper, Jun. 1, 2006, 4 pages.
Foerster et al., "Ultra-Wideband Technology for Short- or Medium-Range Wireless Communications," Intel Corporation 2001, 11 pages.
Final Office Action mailed Feb. 15, 2011 for U.S. Appl. No. 11/868,654.

* cited by examiner

*Primary Examiner* — Sanh Phu
(74) *Attorney, Agent, or Firm* — Charles D. Huston; Daffer McDaniel, LLP (57) ABSTRACT

A wireless docking system and method is provided for monitoring the use of one or more docking stations by multiple portable computers. The system and method provides for the intelligent management of docking stations and connected resources by implementing a protocol that takes into account the identity of the user insofar as one user my have priority to the use of a docking station, the length of time an inactive computer has been connected to a docking station, whether another user requests the use of the docking station, whether the strength of the communication signals between a wireless docking station and computer is adequate to support the use of the docking station, and whether a user wishes to terminate a connection with a docking station.

15 Claims, 10 Drawing Sheets

WIRELESS DOCKING SYSTEM AND PAIRING PROTOCOL FOR MULTIPLE DOCK ENVIRONMENTS

BACKGROUND OF THE INVENTION

1. Field of the Invention

The present invention relates to personal computers and docking stations, also known as port replicators. More specifically, the present invention relates to a pairing protocol for a wireless docking station that may be used to connect one or more portable computers to a docking station. The docking station may in turn be coupled to a network and peripheral devices such as a monitor, keyboard, optical drive or mouse. The pairing protocol may also be used to configure a group of docking stations to maximize the utility of the docking stations to an organization by supporting interoperability between multiple computers and multiple docking stations.

2. Description of the Related Art

The following descriptions and examples are not admitted to be prior art by virtue of their inclusion within this section.

Portable personal computers (PCs), including tablet PCs, laptop computers, and personal digital assistants (PDAs), allow computer users to utilize many of the functions of a personal computer while facilitating freedom of movement about the workplace. Particularly, tablet PCs can offer a very high level of mobility and flexibility to the user. Tablet PCs are often used in the medical profession, where a doctor or nurse can use the tablet PC in place of a pen and paper. The tablet PC allows users to easily update files electronically while also recording data on a single device and moving from point to point. Tablet PCs are also common in manufacturing and warehouse environments, where users benefit from being able to remain mobile and use a single device to electronically record data for the purposes of keeping track of inventory, performing inspections and managing workloads.

Portable computers are generally lightweight and compact, but may compare unfavorably to desktop computers in some respects because they are equipped with smaller keyboards and displays. Further, some portable computers may not have a keyboard, mouse, printer ability, local area network (LAN) connection, or an optical drive. To overcome these shortcomings, many portable computer users connect their computer to a docking station when they are using their computer in an office environment. The docking station can equip the portable computer with most of the characteristics of a desktop computer. Generally, a docking station has numerous ports that provide connectivity to local area networks and peripheral devices such as optical drives, monitors, printers, keyboards, and mice. A user typically initiates a docking session by establishing a physical connection between the docking station and the portable computer, usually by plugging a pin connector on the portable computer into a receptacle connector on the docking station. When the physical connection is made between the laptop and the docking station, the docking station provides the portable computer with access to the necessary ports and any connected peripheral devices. Because the docking stations serve as an intermediate connection between a portable computer and a number of ports by replicating the ports found on many computers, docking stations are also referred to as port replicators.

Figure 1:
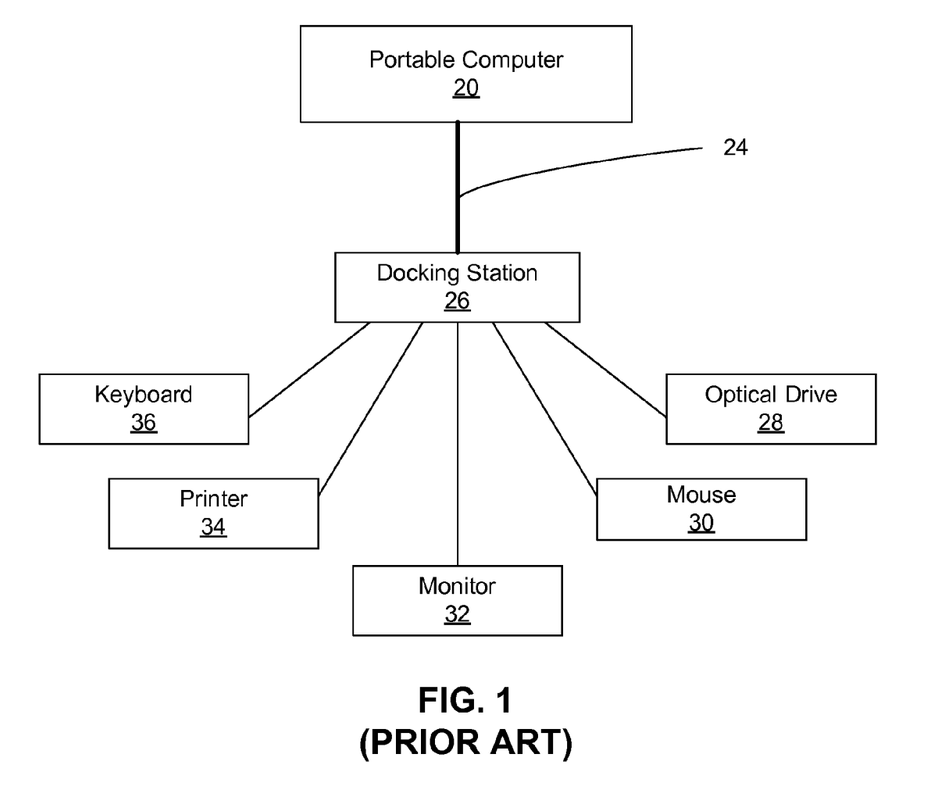
FIG. 1 is a block diagram of a docking station/port replicator that connects a portable computer to several peripheral devices via a wired connection between the docking station and portable computer.

FIG. 1 is a block diagram of a common docking system. The system includes a portable computer 20 and a docking station 26 connected to an optical drive 28, a mouse 30, a monitor 32, a printer 34, a keyboard 36, and possibly other input/output devices or peripheral devices. Most portable computers require a physical (mechanical/electrical) connection to attach a standard set of peripherals such as those shown in FIG. 1. The use of a docking station allows a user to replace the individual connections to each peripheral device with a single connection 24 to the docking station 26.

Some docking station architectures function by extending an internal bridge, such as PCI or PCI Express, of the portable computer to the docking station. Other architectures extend discrete buses, such as USB, VGA, and audio, to the docking station where they can connect to each of the peripherals via replicated ports. The replicated ports may include a variety of interfaces, such as USB ports, an IEEE 1284 parallel port, an RS232 serial port, PS/2 style mouse and keyboard connectors, VGA and/or DVI-style display (monitor) connections, an RJ45 Ethernet port, IEEE 1394 (Firewire), flash card ports such as Sony's Memorystick, Compact Flash, and others. The typical interface between the docking station and the portable computer uses a specialized, self-aligning high-pincount connector assembly that includes hot-plug capability. Because of the complexity and repeated mechanical connection and disconnection of this connector, it is susceptible to fatigue related failure. Another expensive attribute of the physical docking station connector is that the surfaces usually require alignment features to prevent damage to the pins caused by misaligned connection attempts.

Since the shape of the connector makes it difficult to clean, the connector is also a place for dirt or germs to accumulate on the portable computer. Dirt from contaminant-heavy work environments such as cars, work sites, and warehouses can cause the docking connector to fail, which may require the replacement of the computer. Similarly, germs may contaminate the connector of a computer used in a healthcare oriented workspace, such as a hospital, nursing home, or clinic. If a computer in this type of environment becomes contaminated, it can spread germs or infection when it comes into contact with people or communicate the germs to a docking station, which would in turn contaminate other computers and people. Thus, it is desirable to devise a cleaner way to connect a potable computer to a docking station.

Some docking stations attempt to simplify the docking connection by using a USB connection in the place of the high-pincount connector. These docking stations suffer a bandwidth constraint because the USB interface does not have enough bandwidth to support the data rates associated with a monitor display signal combined with data transfers necessary to operate the peripheral devices. Thus, any improved docking station should include a high bandwidth connection. Another limitation of current docking station systems that has yet to be addressed is that the protocols used to operate them only go so far as to contemplate pairing one portable computer with one docking station.

SUMMARY OF THE INVENTION

Many of the aforementioned shortcomings of docking station may be overcome by a wireless docking system. Additionally, a wireless docking system that is able to support multiple computer users connecting to and disconnecting from multiple wireless docking stations would add an unprecedented level of flexibility to workplaces that deploy multiple computers along with multiple docking stations.

A wireless docking system is provided that comprises a docking station, a first portable computer having an established wireless communication link with the docking station, and a second portable computer placed close enough to the docking station to receive a signal strength from the docking station that is strong enough to facilitate the intended use of the wireless docking station. The second portable computer may include a display screen and a graphical user interface for displaying an identification number of the docking station and a query on whether a user wishes to disconnect the first portable computer and connect the second portable computer.

The wireless docking system may also include at least two portable computers, each having a wireless transceiver. The wireless docking system can have at least one docking station equipped with a wireless transceiver, and functions according to a protocol for connecting and disconnecting the portable computers with the docking station based on priority between the portable computers, elapsed time of connection, loss of communication signal strength, or manual input.

Further, a portable computer is provided comprising a transceiver for sending an access signal and receiving an acknowledge signal that, when exceeding a predetermined amount (for instance, in terms of amplitude, signal strength, data rate, or a similar metric), the portable computer initiates wireless communication. The computer may then terminate wireless communication with the docking station based on user input, loss of signal, timeout, priority or initiation of another wireless communication exclusive of the portable computer.

A method is also provided for initiating and terminating wireless communication between portable computers and docking stations. The method may involve moving a first portable computer toward a first docking station, detecting a signal strength of an acknowledge signal sent from the first docking station, initiating a wireless communication link between the first portable computer and the first docking station when the signal strength exceeds a predetermined amount, and terminating the wireless communication link when the signal strength is less than the predetermined amount or when an elapsed time of inactivity of the first portable computer occurs.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, are intended to cover all modifications, equivalents and alternatives falling within the spirit and scope of the present invention as defined by the appended claims.

DETAILED DESCRIPTION OF THE PREFERRED EMBODIMENTS

Ultrawideband (UWB) is a high bandwidth radio technology that is able to support high data rate applications. The UWB communications protocol offers built-in security in the form of encryption, is optimized for short-distance applications, and is defined to operate in the 3.1 GHz to 10.6 GHz frequency range. UWB is meant to transmit information quickly and can also be cost effective by virtue of the low amount of power consumed by UWB transmissions. Bandwidth, the achievable data rate of the transmission, is also drastically improved with UWB as compared to other forms of wireless communication. The increased bandwidth of UWB wireless connections can be capable of data rates in excess of 1 Gbps, which is adequate to allow a portable personal computer (PC) user to connect to peripheral devices without a need for multiple cables and connectors. Thus, a wireless docking station is now possible. A wireless docking station will have a number of advantages over a conventional wired docking station. In addition to bringing a great deal of freedom to a computer user in terms of their mobility and office configuration, the UWB docking station may be much less costly than a wired docking station because the high-pincount connector is no longer needed. Removing this connector will also increase longevity and reliability of the system because the connector represents a possible point of failure. Further, in work spaces that accumulate dirt or other types of contaminants, removal of the connector will allow for a cleaner and more hygienic computer by foreclosing the connector as a mode of spreading contaminants and infection and thereby making the computer easier to clean.

A wireless docking station will also be easier to use because the process of connecting a computer to the docking station may be as simple as placing the computer within range of the dock, eliminating the need to establish a properly aligned electrical-mechanical connection. Another advantage of a wireless docking station is that the docking station may be placed in more convenient locations than a user's desktop, making it less likely that the PC will crowd the user's workspace. Of further benefit, the UWB transmission protocol provides a powerful layer of security. Thus, a wireless docking station can offer a very useful, flexible, and secure alternative to a wired docking station.

Figure 2:
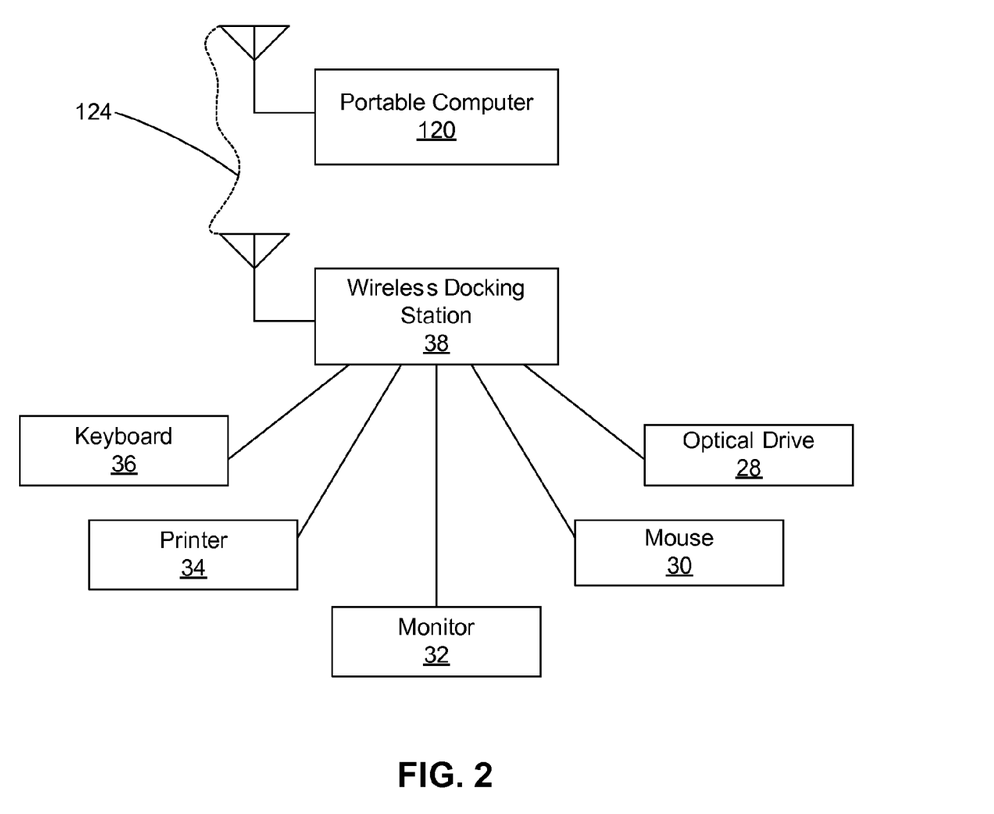
FIG. 2 is a block diagram of a wireless docking station that connects a portable computer to several peripheral devices via a wireless connection between the docking station and portable computer.

Turning to the drawings, FIG. 2 is a block diagram of a wireless docking system. FIG. 2 shows a portable computer 120 and a wireless docking station 38 that is connected to a keyboard 36, printer 34, monitor 32, mouse 30, and optical drive 28. The traditional mechanical/electrical connection is replaced by a high bandwidth wireless (i.e. UWB) connection 124, enabling a computer user to use the devices connected to the docking station 38 without establishing a traditional physical connection.

It is noted that existing wireless communication pairing protocols do not support organizations that have multiple dock-able devices, such as portable computers, deployed alongside multiple docking stations when those organizations desire interoperability between the multiple portable computers and multiple docking stations. Thus, there is also a need for a pairing protocol that will support interoperability between multiple portable computers and multiple docking stations, preferably in a wireless communication environment.

Accordingly, a pairing protocol is provided that overcomes the aforementioned limitation of conventional docking stations: conventional docking protocols only contemplate pairing one portable computer with one docking station. Thus, existing pairing protocols do not support organizations that have multiple portable computers along with multiple wireless docks when the organizations desire interoperability between the multiple portable computers and multiple wireless docks. A pairing protocol is provided that supports interoperability between multiple portable computers and multiple wireless docks. This may be a great benefit to an organization whose employees remain active and mobile while working, and still require access to a computer and/or network. A prime example of this type of organization is a healthcare provider. In the medical field, a doctor or nurse may use their computer instead of a pad of paper while making their rounds, and subsequently as a desktop computer by pairing their tablet PC with a docking station. The benefit of having a wireless docking station in this circumstance is that a doctor, nurse, or other portable computer user would not have to take the time to organize their workspace or establish a mechanical/electrical connection to dock their tablet computer. Wireless docking would enable a computer user to walk into a shared workspace and immediately begin working without having to take the time to remove their computer from their pocket, lab coat, or briefcase. The computer could even be docked while covered by a stack of papers or locked in a desk drawer. In this circumstance, the provided pairing protocol may additionally benefit an organization by greatly improving the flexibility and effectiveness of shared workspaces and other shared resources.

Figure 3:
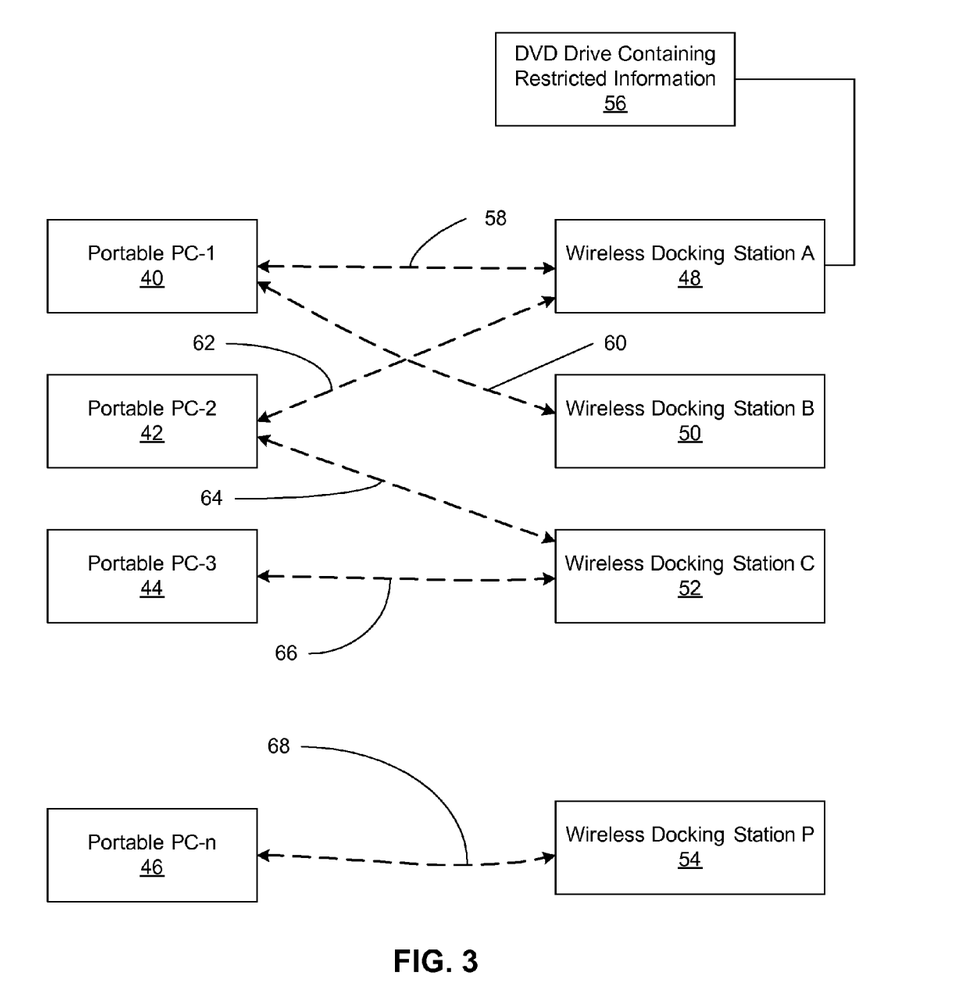
FIG. 3 is a block diagram of a deployment of wireless docking stations that utilizes a pairing protocol for allowing a portable computer to selectively connect to a pre-selected group of wireless docks.

FIG. 3 illustrates a possible deployment of a set of computers and docking stations in accordance with the protocol. Here, a set of portable PCs 40-46 (1, 2, 3 ... n) are shown to have a number of possible connections to a set of wireless docking stations 48-54 (A, B, C ... P). The deployment may be configured in a way that will allocate docking station resources intelligently based on need, security, proximity, priority, etc. Here, portable PC-1 40 may be configured so that it can establish a connection 58 with docking station A 48 or a connection 60 with docking station B 50. In a case where docking station A 48 provides access to a secure resource, such as a high security optical drive 56, access may be restricted so that only a portable PC with clearance (here, portable PC-1 40 and portable PC-2 42) may establish a connection with the restricted docking station 48 and the attached restricted device 56. Similarly, portable PC-2 42 may establish a connection 62 with docking station A 48 or a connection 64 with docking station C 52. Portable PC-3 44 may establish a connection 66 with docking station C 52, but not with docking station A 48 or docking station B 50. Portable PC-n may establish a connection 68 with docking station P 54, and no other docking stations.

An important benefit of utilizing UWB for docking station related communication is that the communications protocol features built-in security in the form of encryption. Encryption is the process of encoding information in such a way that only the person (or computer) with the encryption key, a code that the devices use to encrypt or decrypt a packet of information that is transmitted to or from a device, can decipher the information. Encryption facilitates secure communication between two devices that are each equipped with the same encryption key, thereby preventing an intruder or eavesdropper from intercepting the transmitted data. In this embodiment, the security keys specified in the ECMA-368 UWB Standard, or equivalent encryption keys, may be used. Symmetric keys, keys that are known only to the parties that exchange encrypted communications and used for both encrypting and decrypting communications, may be used. The ECMA-368 Standard, which is herein incorporated by reference, specifies a 4-way handshake mechanism to enable two devices to derive pair-wise temporal keys (PTKs) while authenticating their identity to each other, and a means for the solicitation and distribution of group temporal keys (GTKs). Generally, a pair-wise temporal key is used to encrypt and decrypt protected communications exchanged between two devices (a pair), and group temporal keys are used to protect communications that are broadcasted to a group of devices. The keys are temporal because they have a fixed lifetime and are replaced frequently. The standard also specifies that 128-bit symmetric temporal keys are employed based on AES-128 with Counter Mode Encryption and Cipher Block Chaining Message Authentication Code to provide payload encryption and message integrity code (MIC) generation.

AES-128 is an advanced encryption standard specified in Federal Information Processing Standards Publication 198. Counter with Cipher Block Chaining-Message Authentication Code (CCM) is an algorithm that can provide assurance of the confidentiality and authenticity of data. CCM is based on an approved symmetric key block cipher algorithm whose block size is 128 bits, such as the Advanced Encryption Standard (AES) algorithm currently specified in Federal Information Processing Standard (FIPS) Pub. 197[2]. AES-128 CCM combines AES-128 with CCM to encrypt and authenticate messages. Encryption is done on part or all of the secure transmission, and authentication is provided by a message integrity code that is included in the transmission. Here, message integrity code is an algorithm that is used to protect the integrity and authenticity of a message by allowing the recipient of a message to detect any changes to the content of the communication. The ECMA-368 Standard defines two levels of security: no security and strong security protection. Strong security code includes data encryption, message integrity code, and replay attack protection, which functions to prevent an eavesdropper from being able to record and replay a transmission to decode it over time. Based on the two levels of security, three security modes are defined to control the level of security for devices in their communications: a device may use one of the two security levels or a combination of them in communicating with other devices by selecting the appropriate security mode.

To derive UWB security keys, the ECMA-368 Standard further specifies a "4-way handshake mechanism," a process that enables two devices to derive pair-wise temporal keys (PTKs) and group temporal keys (GTKs) while authenticating their identity to each other. The handshake process, which is based on a shared master key that is independently provided to the two devices as a building block of the PTKs, is used to establish a secure relationship between two devices. The handshake process begins when an initiator device composes and sends a first message that includes a PTK derivation command to a responder device. In this command, the initiator specifies the master key for use in the handshake and proposes a parameter from which to derive the PTK based on a pseudo-random function. The responding device then verifies the uniqueness of the transmission and proceeds through the four step process to derive the PTK in conjunction with the initiating device. Each step of the handshake involves validity and uniqueness checks to ensure that the key derivation process is secure. Once PTKs have been derived, GTKs may also be exchanged, and the two keys may operate to encrypt and decrypt communications between UWB enabled devices.

Figure 4:
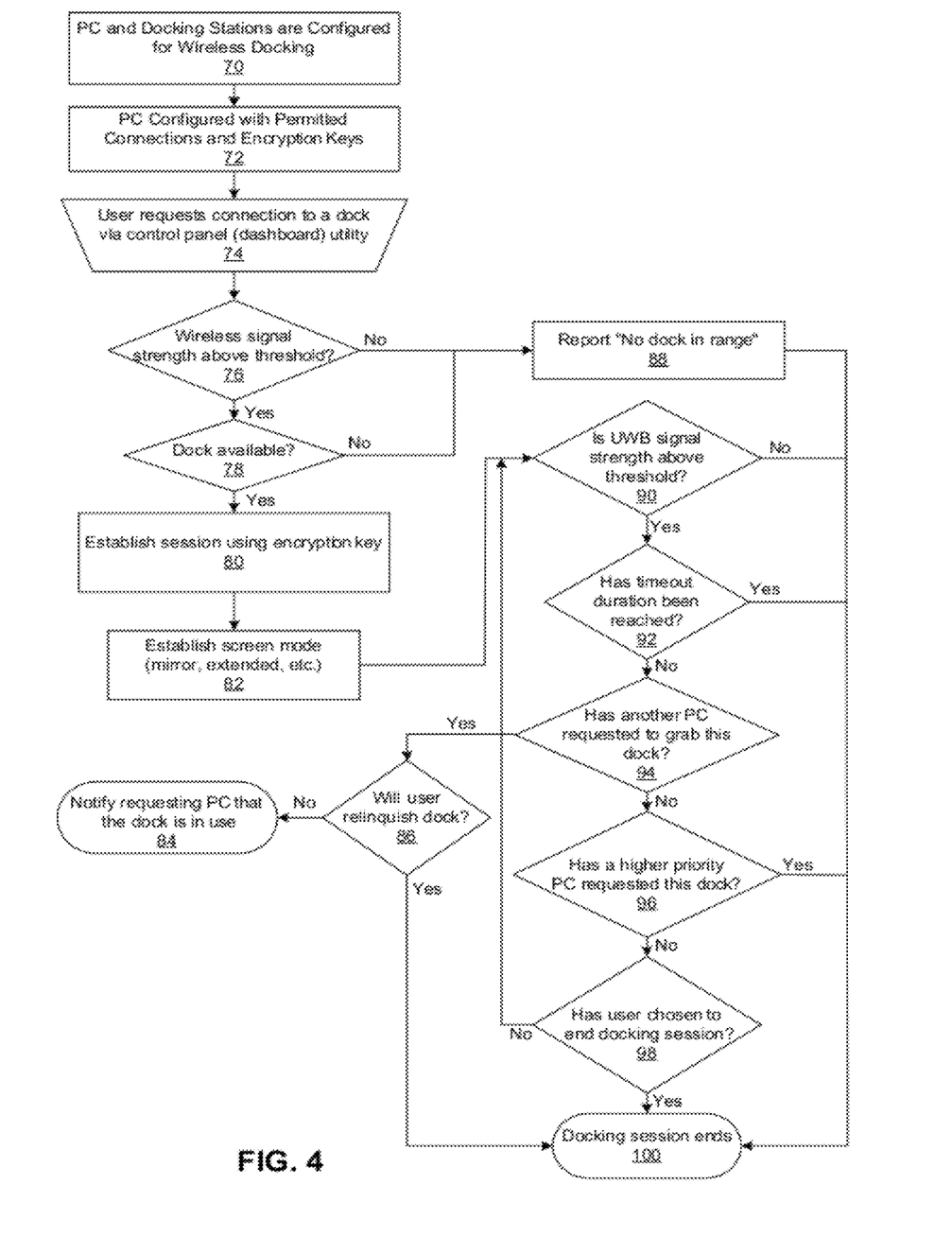
FIG. 4 is a flow chart of the basic operation of the pairing protocol disclosed herein.

FIG. 4 is a flow chart showing the pairing protocol. The first step is to configure PCs and docking stations for wireless docking 70, and subsequently to configure the PCs for permitted docking station connections and encryption keys 72. Next, the user may request a connection to a docking station via a control panel software utility 74. The software utility may be designed to run on a Microsoft platform, such as Windows Vista, or a comparable operating system. The wireless communication system of the computer will then determine whether the wireless signal strength is above the threshold required for wireless docking 76. If the signal is too weak or the data rate is too slow, the computer will report to the user that there is no dock in range 88 and the user will then have to restart the process. If a docking station signal strength or data rate is detected that is above the threshold, the software will determine whether a docking station is available 78. In this context, "available" means that the docking station is a docking station that the PC was configured to connect with during the configuration stage 72. In other words, a dock may still be available for the purposes of making this determination of availability even if there is a computer connected to the docking station. If a docking station is not available, a "no dock in range" report 88 will inform the user that a docking station is not available. If a docking station is available, then the computer may establish a secure connection with the docking station using the encryption key 80. The user may then establish a screen mode for using their computer while connected to the docking station 82 (e.g. mirrored or extended). Once connected, the computer will continuously monitor for a number of events that may end the docking session. First, the wireless signal strength will be continuously monitored to ensure that it is strong enough to support the docking session 90. If it is not, the docking session ends 100. Second, if a "timeout" (the passage of a predetermined amount of time where there is no use of the docking station by the user or computer) occurs 92, then the docking session ends 100. Third, another PC may request to grab the docking station 94. Here, the user has the option of keeping the dock or relinquishing it 86. If the user chooses to relinquish the docking station, the docking session will end 100. If the user chooses not to relinquish the docking station, then the requesting PC is notified that the docking station is in use 84. Fourth, if a higher priority PC requests a connection with the docking station 96, then the docking session will end 100. Finally, the docking session may end 100 if a user chooses to end the docking session 98.

Figure 5:
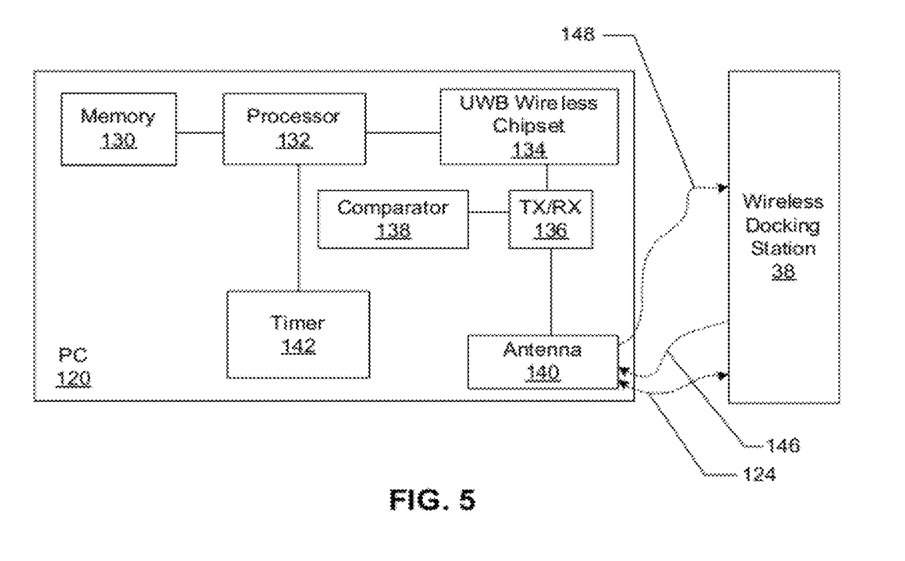
FIG. 5 is a block diagram of at least a part of a personal computer with the traditional docking connector replaced by a wireless (i.e. ultrawideband/UWB) transceiver and antenna.

FIG. 5 is a block diagram of at least a part of a personal computer with the docking connector replaced by a wireless (i.e. ultrawideband, or UWB) transceiver antenna. The PC 120 may contain a memory 130 for storing the configuration of the docking system. Processor 132 may implement the software used to run the system in conjunction with a timer 142 for monitoring timeouts. The PC 120 may also contain a wireless chipset 134 to facilitate wireless communications, along with a transceiver 136 coupled to a comparator 138, and an antenna 140. Generally, there may be three types of communication exchanged between the PC 120 and a docking station 38. First, the PC may emit "pings" 148 to determine whether a docking station is in range. The response to the "pings" 148 may be an acknowledge signal 146 from the docking station 38. This signal may be compared against a predetermined threshold by the comparator 138 of the PC. If the signal strength is adequate to support a docking station connection, docking session communications 124 may be exchanged between the PC 120 and the docking station 38. The functions of sending pings 310 and acknowledge signals 311 may be accomplished by wireless transceivers of the docking station and portable computer acting as beacons, as described by the ECMA 368-UWB Standard. Similarly, coordination of devices within radio range may be achieved by the exchange of beacon frames, and periodic beacon transmissions may be used to enable device discovery.

It should be noted that in some cases, the roles of emitting pings and emitting corresponding acknowledge signals of the PC 120 and docking station 38 may be reversed in order to conserve the stored battery power of the PC 120. In such a case, the ping signals would be emitted by the docking station 38 and a PC 120 within range may respond with an acknowledge signal. Here, the comparator 138 of the PC 120 may compare the strength of the ping signal against a predetermined signal strength to determine whether the PC 120 and docking station 38 are within range of one another.

Figure 6:
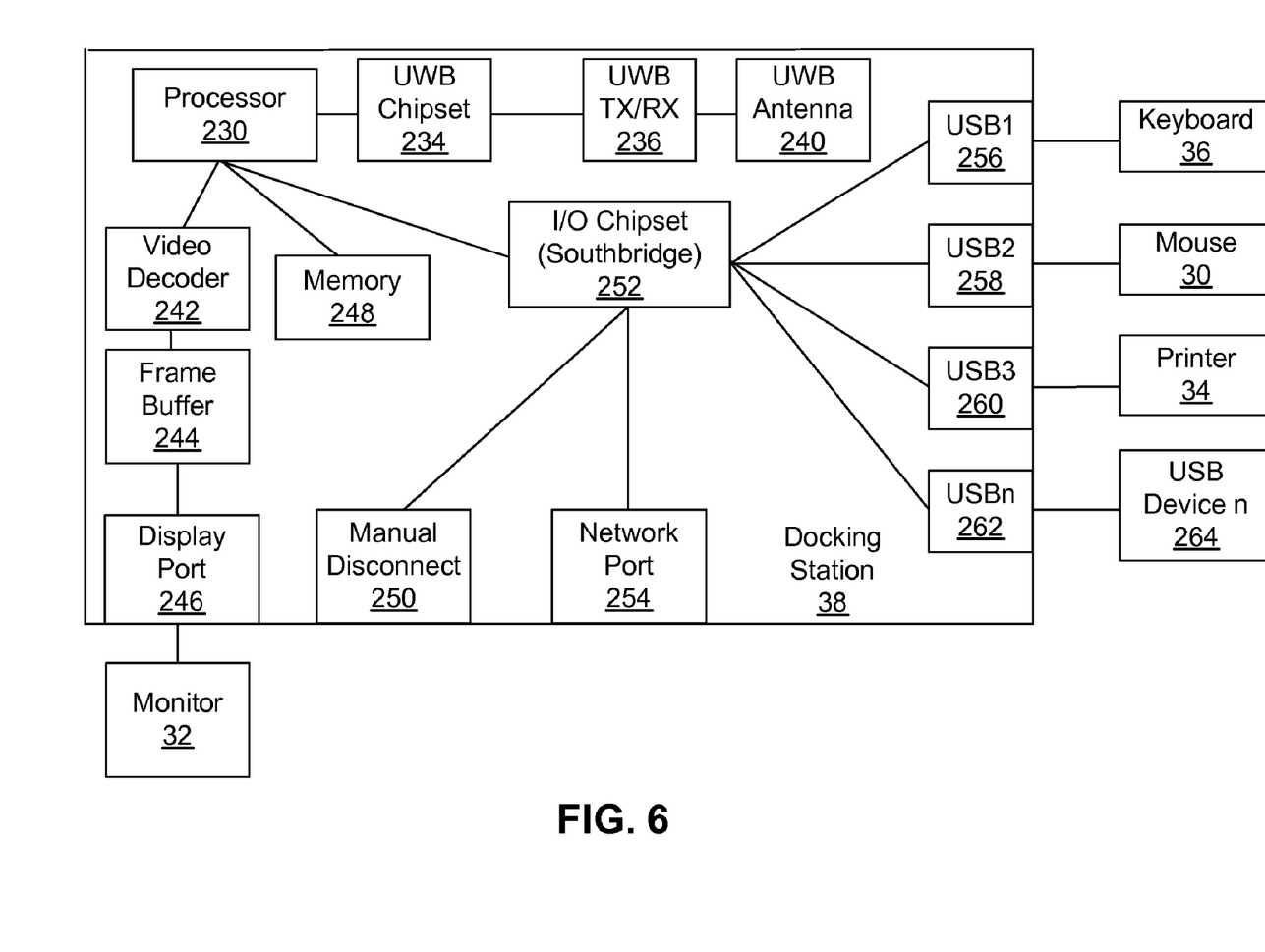
FIG. 6 is a block diagram of at least a part of a docking station architecture for converting wireless (ultrawideband/UWB) transmissions to common dock functions.

FIG. 6 is a block diagram of at least a part of a docking station architecture for converting wireless (i.e. UWB) transmissions to common dock functions. The docking station 38 may have 4 or more USB ports 256-262 to connect a keyboard 36, mouse 30, printer 34, and/or miscellaneous USB enabled device(s) 264. A network port 254, the USB ports 256-262, and a manual disconnect switch 250 may connect to a processor 230 via a bus bridge, bus interface, or input/output chipset, referred to herein as a Southbridge 252. The docking station will also have memory 248 to store configurations and any firmware necessary to the operation of the protocol. Wireless docking connections may be achieved by a wireless chipset 234 that is coupled to a transceiver 236 and antenna 240. The docking station may also support a VGA, DVI, or other display output from a display port 246. The display port may be connected to the processor 230 via a video decoder 242 and frame buffer 244. It is noted that in the place of (or in addition to) the additional USB port(s) 262, the docking station may include legacy port connections, such as RJ45 Ethernet, IEEE 1394, IEEE 1284 and RS-232 ports.

The wireless docking system may be implemented by connecting a wireless chipset 134 such as a UWB chipset to the computer through an internal system bus, such as mini-PCI, PCI, or PCMCIA to create the PC side of the wireless communication, as shown in FIG. 5. The wireless chipset 134 communicates with the processor 132, memory 130, and/or other peripherals via a standard PC bridge chipset. The system may also be implemented by any similar approach that will achieve substantially the same basic connectivity. For instance, in some cases it may be desirable to transmit PCI or PCI Express protocol via the wireless transceiver 236 and antenna 240, to connect a PC to the peripheral devices of the docking station 38. At present, transmission of PCI Express protocol requires a large amount of bandwidth as compared to the allowable bandwidth of wireless transceivers. Thus, transmission of PCI Express protocol via the wireless medium would require a bridge chip to buffer the wireless transmissions, which may adversely affect performance of the docking system. However, such a bridge chip is possible, and may become desirable as transmission technologies advance. Here, PCI Express is a newer type of bus bridge that has been designed to takeover the role in computer architecture that has been traditionally occupied by the PCI bus bridge. Like PCI, PCI Express functions to connect input and output devices to the input/output controller hub, or Southbridge, of the computer. However, PCI Express differs from PCI in that it is able to attain better data rates than PCI by replacing the shared bus model of a PCI system with a shared switch model. The shared bus model of the PCI architecture requires input/output devices to arbitrate for the use of the bus. Conversely, the PCI Express architecture achieves faster data transfer rates by allowing point to point communications between the input/output devices and the switch, which then routes the data to the input/output controller hub.

An embodiment of the docking station, as shown in FIG. 6, may include a wireless UWB chipset 234 in the docking station 38. A processor 230 may control bus arbitration and data transfers. Connections to a possible combination of connections to supported peripherals 256-262, such as a monitor via a display port 246, keyboard 36, mouse 30, printer 34 or optical drive via a USB port 262 will connect to the bus or may be integrated into a single common input/output chipset 252 that may include the UWB chipset 234. Approaches for connecting the peripherals may vary from system to system. Further, the processor 230 of the docking station 38 may execute firmware necessary to operate the UWB chipset 234 and other input/output device initialization, data transfers, and controls.

Because UWB offers a flexible and secure channel of wireless communication, the docking stations may be adjustable in terms of their reception range. For example, if users need access to a docking station for the purposes of accessing a restricted optical drive or other resource, the docking station may be configured such that it can be accessed over a longer range. Conversely, when a docking station is meant to be accessible for the purposes of equipping a tablet PC user with a full size monitor, keyboard, and mouse, it may be configured in a way that it can only be accessed by a user within one meter of the docking station. The UWB range may also be determined and preset by a system administrator to correspond to the resources that the docking station makes available. UWB transmission data rates generally correspond to the distance between the UWB devices. The effective range of a UWB docking station may be 2 meters for a resource requiring a bandwidth of 480 Mbps, 4 meters for 200 Mbps, and 10 meters for 110 Mbps. Thus, the useful range of the docking station may be adjustable depending on the resources that are available through the docking station. For instance, a docking station that only serves to provide access to a secure optical drive may function adequately up to 10 meters away, while a docking station that serves the primary purpose of providing access to peripherals and a monitor may require the portable computer to be within one meter of the docking station. Additionally, the pairing protocol may employ UWB devices that support "ranging" as specified by ECMA International Standard ECMA-368 (ISO/IEC Specification 26907) to determine the distance between UWB devices for the purpose of determining whether a docking station is within range.

Figure 7:
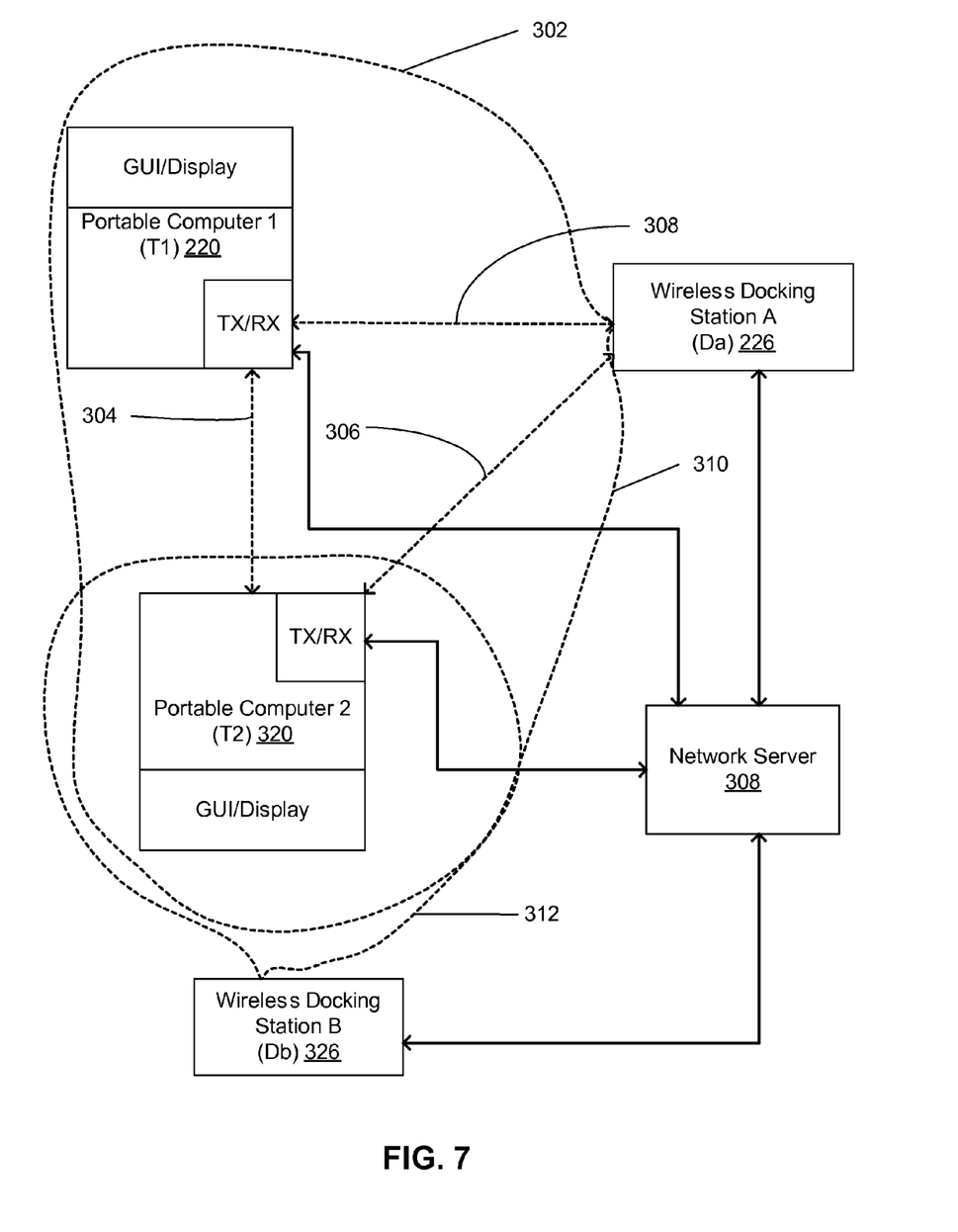
FIG. 7 is a block diagram of a deployment of personal computers and wireless docking stations that utilizes a pairing protocol for allowing a portable computer to communicate directly with another portable computer for the purpose of establishing a connection with a docking station.

FIG. 7 is a block diagram of a deployment of a first computer 220, a second computer 320, a first wireless docking station 226 and a second wireless docking station 326. The deployment utilizes a pairing protocol for allowing a second portable computer 320 to establish a line of communication 304 with a first portable computer 220 for the purposes establishing a connection 306 with a docking station 226. The figure also shows the range 302 of the first docking station 226 and the range 312 of the second docking station. Also shown is a network server 314 that may be used to centrally execute mapping that may be useful for the deployment of multiple computers along with multiple docking stations.

Figure 8:
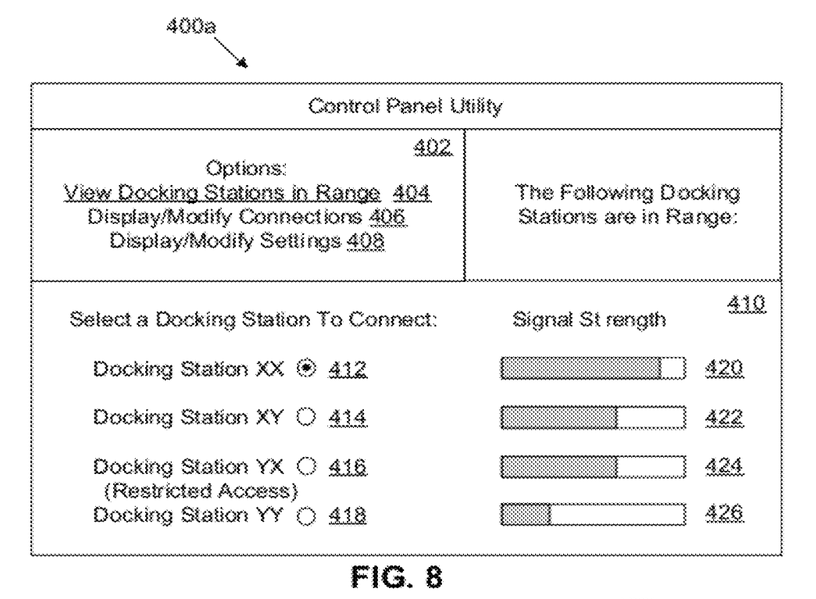
FIG. 8 is a representative view of a control panel software utility used by a personal computer user to connect to a wireless docking station in accordance with the docking protocol.

FIG. 8 is one of many possible views 400 of a control panel software utility used by a portable computer user to connect to a wireless docking station in accordance with the docking protocol. This view shows window 400a with a compartment 402 identifying the options available to the user. Here, a user may select "View Docking Stations in Range" 404, "Display/Modify Connections" 406, or "Display/Modify Settings" 408. The selected option, "View Docking Stations in Range" 404 is underlined. Alternatively, the selected option 404 could be identified by using any type of indicator, such as a different color, bold or italicized text, a check box, etc. Here, a second window compartment 410 shows the docking stations in range with a corresponding control 412-418 that, if selected will initiate the docking process. Optionally, the control panel utility may be configured to display only docking stations that will support connections with the user and computer based on the configuration of the docking system. Here, if a user is not authorized to connect to a particular docking station, then that docking station will not appear in the user's control panel utility. The second compartment of the control panel display 410 may also show the signal strength 420-426 of each available docking station 412-418. A particular docking station may provide access to a restricted resource, such as an optical drive containing confidential information. The docking station providing access to the restricted resource may be displayed with text denoting that access is restricted to computers or users with clearance to access the resource 416.

Figure 9:
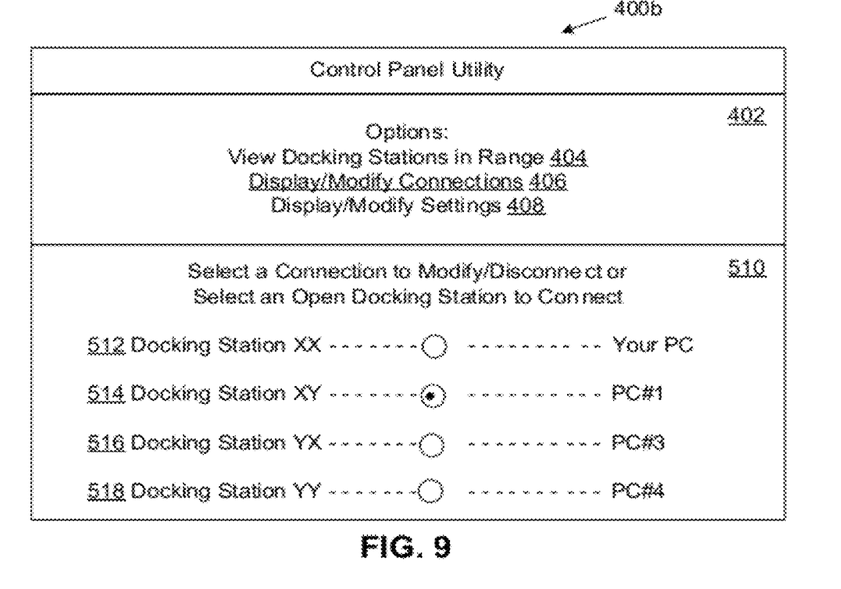
FIG. 9 is a representative view of a control panel software utility used by a personal computer user who does not have the ability to force a disconnection of another user's docking session to view and/or modify existing connections between other personal computers and a set of wireless docking stations, or to establish a connection with a wireless docking station in accordance with the docking protocol.

FIG. 9 is an alternative view of control panel software utility window 400 used by a portable computer user to view or modify docking station connections. This view shows a window 400b with a compartment 402 identifying the options available to the user. A user may select "View Docking Stations in Range" 404, "Display/Modify Connections" 406, or "Display/Modify Settings" 408. The selected option, "Display/Modify Connections" 406 is underlined. Here, a second window compartment 510 shows the docking stations in range along with their connection status and a control for selecting a docking station to modify 512-518.

Figure 10:
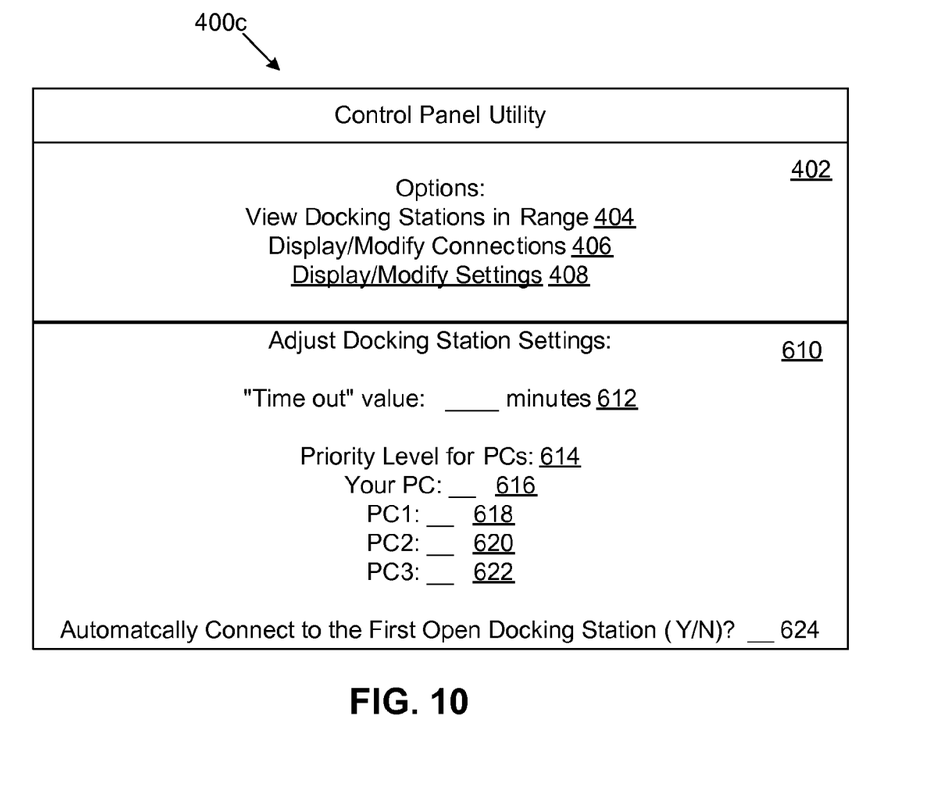
FIG. 10 is a representative view of a computer screen showing a representation of a system tray icon corresponding to a docking station connection and a "right-click" menu that a user may use to make a selection of available actions related to establishing and ending connections with a wireless docking station in accordance with the docking protocol.

FIG. 10 is an alternative view of control panel software utility window 400 used by a personal computer user to view and/or modify some of the settings and configuration related to docking protocol. This view shows a window 400c with a compartment 402 identifying the options available to the user. A user may select "View Docking Stations in Range" 404, "Display/Modify Connections" 406, or "Display/Modify Settings" 408. The selected option, "Display/Modify Settings" 408 is underlined. Here, a second window compartment 610 displays various settings that may be adjusted. The first option that may be adjusted from this menu is the "Time Out" value 612. Here, a user can set the amount of time that they want their computer to remain connected to a docking station after the computer has become inactive. The next configuration option is the priority level for the multiple PC's within range 614. Here, a user with administrative privileges can set a priority for the user's PC 616, and three other PCs 618-622. The user can also decide whether they want their computer to automatically dock with the first open docking station that it finds by typing "Y" or "N" in the "Automatically Connect to the First Open Docking Station (Y/N)" line 624.

Figure 11:
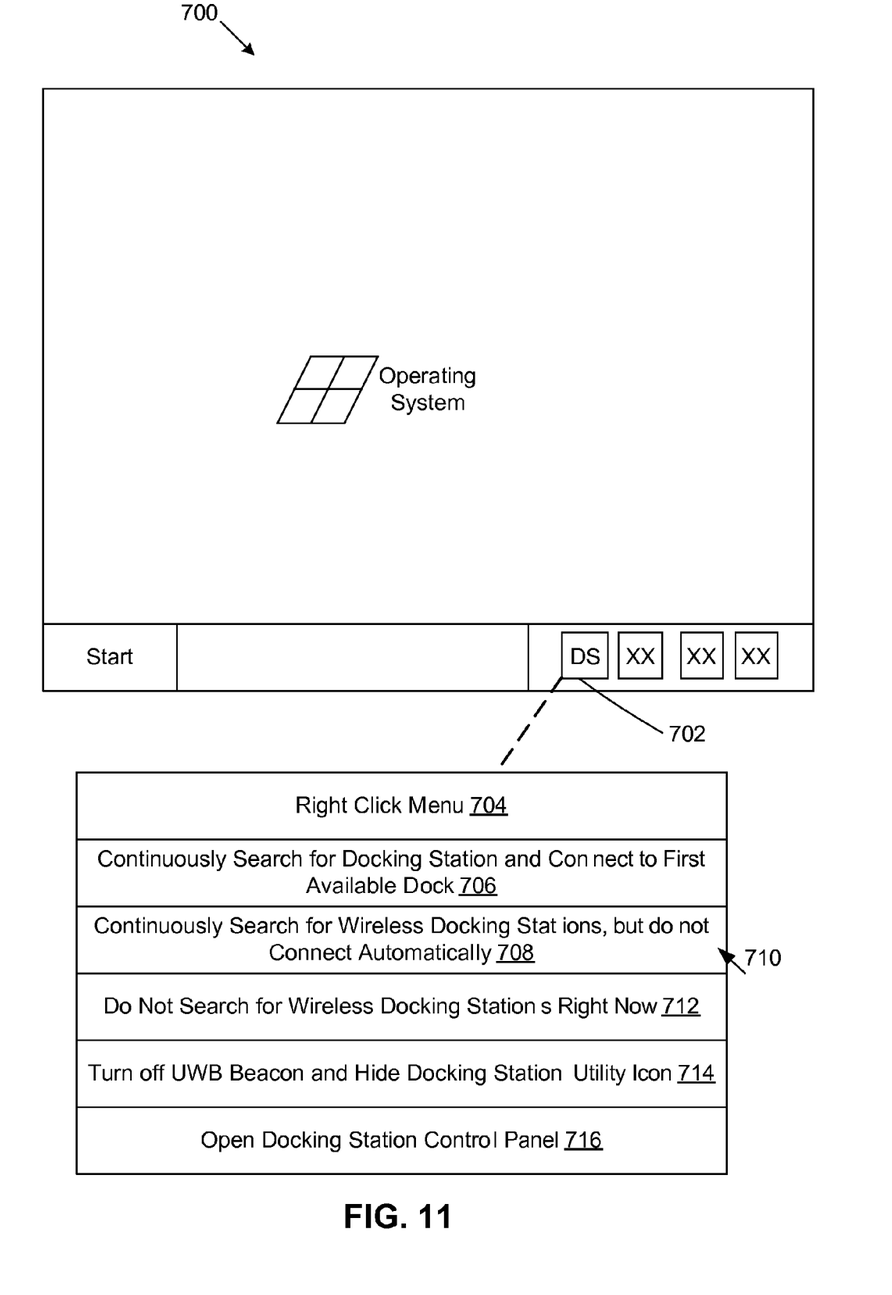
FIG. 11 is a representative view of a control panel software utility used by a personal computer user to view and/or modify administrative settings applicable to a set of wireless computers and wireless docks in accordance with the docking protocol.

FIG. 11 is a representative view of a computer screen showing an operating system 700. The bottom right of the screen shows a system icon related to the docking station software 702. If a user clicks on this with the right mouse button, a "Right Click Menu" 704 will open. This menu allows the user to quickly command the PC to "continuously search for a docking station and connect to first available dock" 706, "continuously search for wireless docking stations, but do not connect automatically" 708, "do not search for wireless docking stations right now" 712, "turn off UWB beacon and hide docking station utility icon" 714, and "open docking station control panel" 716. The position of the mouse may be indicated by a highlighted row, bolded text, or a similar indicator 710 corresponding to the selected row/option.

In an exemplary scenario, six workers with six tablet PCs may share a common workspace that is equipped with only four docking stations. In this example, there are not enough docking stations for each worker to have a dedicated dock. The pairing protocol shown in FIG. 4 may intelligently manage resources in this situation because it provides a number of avenues for managing docking station resources beyond users manually connecting and disconnecting from the docking stations. First, if a user leaves their computer docked and exits the workspace, their docking session may "time-out" 92 and end 100 after a specified period of inactivity, which will free up the dock for a second user. This alleviates the second user the burden of finding the first user's computer and manually disconnecting it or the more time consuming alternative of finding the first user and personally asking them to return to the workspace to relinquish the dock. Second, users will likely use a control panel type software application to determine whether a dock is available 78. This software interface will show the user whether docks are available and the identity of other users who are connected to the docks 88. If it appears that dock resources are allocated to a second user that does not appear to need the docking station, then the user can initiate a request to permissively grab the docking station from the second user 94. Here, the second user may be prompted via a "yes" or "no" dialogue box through their control panel application to voluntarily relinquish control of the docking station 86. If they select "yes" then the docking station will be relinquished so that the requesting user may have access to the docking station.

Similarly, an organization may assign priority levels to its users so that some users effectively outrank others with respect to entitlement to docking station resources. If a requesting user has a higher priority than the second user, they could force the relinquishment of a dock based on their higher priority without going through the procedure of requesting relinquishment of the docking station from another user. The pairing protocol may also allow a user to relinquish the docking station from the control panel without prompting, and may end the docking session automatically if the UWB or similar wireless signal is too weak to support the wireless docking session. Thus, the protocol allows an organization to manage docking resources by establishing pre-defined docking policies rather than requiring users to sort out the allocation of resources manually.

In addition to allowing an organization to establish a hierarchy of users, this pairing protocol may also allow an organization to control access to specific records, information, or other resources. For instance, an optical drive containing information that must be kept confidential, such as medical records, may be accessible only via a subset of docking stations. This subset of docking stations may be configured in a way that will restrict access to a limited group of users who are designated to access the information.

The intelligent protocol for dynamic pairing of a PC to a wireless dock in an environment of many PCs and docks is of added utility in an environment with many mobile portable PC users. Users will be able to move within range of a wireless dock and then choose to initiate a temporary pairing. IT-established security policies are checked to ensure authorized connection, and then the connection is established. Conflicts with other PCs or docks in the area are resolved, and management of disconnects is taken into account. Further, docking resources will be more efficiently managed by the protocol because connected but idle PCs are prevented from holding onto a dock indefinitely.

In one embodiment, there may be a deployment of tablet PCs and docking stations similar to those shown by FIG. 3 and FIG. 7. A lightweight directory access protocol (LDAP), such as Microsoft's Active Directory for Windows environments, may be used to enable the mapping of relationships between multiple docks and multiple computers in a centralized manner. Accordingly, some computers may be restricted by either permission settings or docking station ranges from connecting to particular docking stations, and vice versa. It is noted that the ECMA UWB specification and other wireless communication systems do not contemplate this type of mapping of interoperable relationships for a multitude of devices such as docking stations and computers.

Generally, a Lightweight Directory Access Protocol (LDAP) defines four components of the operating system: (1) the data model, which defines the syntax of the data in the directory; (2) the organizational model, which defines how the data is organized in the directory; (3) the security model, which defines how the information in the directory is accessed in a secure manner; and (4), the functional model, which defines the operations for querying and modifying the directory. By coupling a LDAP to a control panel utility, a user or administrator may configure multiple computers and/or docking stations to function according to policies made available by the docking protocol. A LDAP directory structure is generally a framework of objects, consisting of three categories: (1) resources, such as docking stations or printers; (2) services, such as email; and (3) users, including accounts, users and groups. The objects are organized by the LDAP, which also provides information relative to the objects, controls access, and controls security. Within a LDAP, there is a schema to define the characteristics of objects, such as computers and docking stations. Thus, an administrator may be able to define settings related to the docking protocol across a network by taking advantage of the capabilities of a LDAP.

Here, a LDAP enables a centralized control over the configuration of a deployment of multiple docking stations and multiple computers by storing the system mapping information and configuration on a server that operates a network operating system such as Windows Server or Novell. The LDAP may also be used to define and map the relationships between multiple docking stations, docking station resources, computers, network resources, users, groups of users, and any combination thereof. Further, the LDAP may serve as a tool to implement the docking protocol with a centralized ability to map the desired relationships between computers and docking stations is achievable. Thus, the ability to store client, dock, and network access codes in a central location so that a computer may query through the network to ascertain current docking system configurations and relationships is provided. In sum, utilization of a LDAP may allow for simple central authentication and authorization services along with the ability to store information and settings in an accessible central database. The LDAP may also provide a means for defining and assigning policies, and applying updates to the system. Thus, in one embodiment, a client running on a portable computer may identify all docks in range, and display to the user only those docks for which the user, computer or both are allowed to pair with. Here, the control panel utility may not display docks that the user and computer are not allowed to dock with.

According to one embodiment, the docking protocol may be implemented by first configuring a portable computer to allow wireless docking A computer with wireless connectivity hardware may be configured by an administrator to allow or disallow docking This configuration can be modified by a user with administrative rights or pre-configured by an organization's information technology (IT) staff. Similarly, IT staff and users with administrative rights may also configure the computer to prompt when a dock is available, or configure the computer to not prompt. The next step in this implementation is to configure the computer for security requirements by (1) configuring the computer to communicate using an ultrawideband security key, (2) pre-loading a security key for each docking station, and (3) loading security keys corresponding to all authorized docking stations into the computer.

The protocol may initiate when a computer that has been appropriately configured enters the effective range of a docking station, indicating that the computer is within range of a docking station by displaying a pop-up window or an icon in the system tray. The user may then request a connection to a wireless dock by initiating a control panel software utility. The computer may then send a UWB or other wireless broadcast asking for a ping back from any device that hears it. The wireless docking stations that are within range of the computer will respond to the ping. Next, a window on the computer may display a dialogue box that identifies the docking station with an alphanumeric string identifier that corresponds to a docking station asking if the user wishes to initiate docking The user may then select either "Yes" or "No." The docking station's alphanumeric identifier may also be displayed on a monitor (or LED display) of the wireless dock. There may be more than one identification number displayed if there are multiple wireless docks in range. This allows the user to select from a number of docking stations to establish a connection. When a user chooses to initiate the wireless docking sequence and selects a docking station for connection by responding to the dialogue window, the computer sends an encrypted packet to the docking station to request a connection and deliver the UWB (or other wireless) identification number. The wireless dock may then respond with an acknowledgment, at which point the portable computer and docking stations will be paired exclusively to each other.

Once the computer has been paired with a docking station, the computer may operate as if it were connected to a traditional docking station. The USB devices (and/or other peripheral devices) connected to the docking station and a monitor attached to the VGA port function as if they are connected directly to the PC. While a computer is docked, the quality of the connection between the computer and the docking station may be monitored to ensure that the signal is of sufficient strength to operate the monitor and peripheral devices. Configurations may also be established for managing screen display options (mirrored or extended, for example) and other attributes.

When the user wishes to terminate the docking session, the user may do so using the control panel utility to cause the computer to issue a command to terminate the session. This may be accomplished through use of the aforementioned control panel utility, another software control on the taskbar, or a dedicated button placed on the computer or the docking station. The computer may then send a packet to the docking station commanding it to release the connection, and the docking station may stop transmissions with the current computer and await the arrival of another.

Another way to terminate the docking session may be to initiate a disconnection process at the docking station. Here, a button on the docking station may be used to indicate a manual request to terminate the docking session. The docking session may also be terminated by the loss of the wireless connection between the computer and the dock. If the PC loses the UWB signal that it uses to communicate with the dock, perhaps caused by the computer being carried out of the range of the docking station, the computer will lose connection to USB and VGA devices connected through the docking station. The computer and the docking station may interpret this as meaning that the docking session has been terminated, and treat the loss of radio connection as a termination. Similarly, the docking session may be terminated by a "time-out" if there is no activity (data moving to or from the dock) for a pre-selected time period. If a time-out occurs, the docking station may reset its devices and buffers and prepare for a docking request to be received from another computer.

In some cases, a second user may force the termination of the docking session. For instance, a computer may be connected to a docking station but not in use; the computer may be locked in a drawer or hidden under a stack of papers, and the user may have moved away from the workspace. In this situation, another user may want to use the dock (probably in a shared workspace). Here, the user of the second computer may request a connection to the wireless dock by initiating a computer-based software utility as outlined above. The second user may enter an alphanumeric identifier corresponding to the docking station with which the user desires a connection, or otherwise select the docking station via the control panel. The docking station may then be queried about its connection status and subsequently respond that it is in use. At this point, the second user may request a forced termination of the docking session, and the dock may send a command to the connected computer requesting to terminate the docking session ("un-dock"). The first computer may then display a dialogue box showing that an un-dock request has been made, and the computer's dock connection may be broken if the user of the first computer approves the disconnection or does not respond within a pre-set amount of time. Policies may also be established regarding the enablement of forced termination. These policies may address whether a computer user is allowed to force the termination of the docking sequence of another user's docking session, and/or establish a hierarchy determining which users or computers have the ability to disconnect others from a docking station.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A wireless docking system, comprising:
a docking station;
a first portable computer having an established wireless communication link with the docking station; and
a second portable computer placed within range of the docking station needed to achieve a signal strength from the docking station exceeding a predetermined amount, wherein the second portable computer includes a display screen and a graphical user interface for displaying an identification number of the docking station and a query on whether a user wishes to disconnect the first portable computer and connect the second portable computer.

2. The docking system as recited in claim 1, wherein the second portable computer comprises a transceiver for sending an access signal to the docking station and receiving an acknowledge signal that, when the acknowledge signal magnitude exceeds the predetermined amount, the second portable computer is within range.

3. The docking system as recited in claim 1, wherein the graphical user interface displays on the display screen that the docking station is within range whenever the signal strength from the docking station exceeds the predetermined amount.

4. The docking system as recited in claim 1, wherein the graphical user interface displays an identification number unique to the docking station whenever the signal strength from the docking station exceeds the predetermined amount.

5. The docking system as recited in claim 1, further comprises other docking stations and wherein the graphical user interface displays multiple identification numbers unique to the docking station and said other docking stations whenever the signal strengths from the docking station and the other docking stations exceed the predetermined amount.

6. The docking system as recited in claim 5, wherein the graphical user interface is configured to present on the display screen a dialog box from which a user can selectively connect and/or disconnect the docking station and one or more of the other docking stations to and from the second portable computer.

7. The docking system as recited in claim 1, further comprising a timer that, when inactivity of the first or second portable computer reaches a predetermined timeout value, the first or second portable computer, respectively, is disconnected.

8. A wireless docking system, comprising:
at least two portable computers, each portable computer having a wireless transceiver;
at least one docking station having a wireless transceiver; and
a protocol for connecting and disconnecting the portable computers with the docking station according to a priority between the portable computers, wherein said priority between the portable computers comprises a priority number uniquely assigned to each of the two portable computers, and wherein said protocol comprises connecting the portable computer having the higher priority and disconnecting the portable computer having the lower priority.

9. The docking system as recited in claim 8, wherein said protocol comprises connecting the portable computer having the higher priority and disconnecting the portable computer having the lower priority based on input from the portable computer having higher priority.

10. The docking system as recited in claim 8, wherein said protocol for connecting and disconnecting the portable computers with the docking station additionally operates according to an elapsed time of connection, and wherein said elapsed time of connection comprises a timer associated with the connection of each of the two portable computers to the docking station and disconnecting an inactive one of the portable computers whose timer has elapsed through the duration of inactivity.

11. The docking system as recited in claim 8, wherein said protocol for connecting and disconnecting the portable computers with the docking station additionally operates according to a loss of communication signal strength, and wherein said loss of communication signal strength comprises a comparator coupled to the transceiver of each of the portable computers for comparing a magnitude of an acknowledge signal from the docking station to a predetermined amount and for disconnecting the portable computer whose comparator registers an acknowledge signal below the predetermined amount.

12. The docking system as recited in claim 8, wherein said protocol for connecting and disconnecting the portable computers with the docking station additionally operates according to a manual selection, and wherein said manual selection comprises a display and graphical user interface coupled to the display of each of the two portable computers for presenting a dialog box from which a user can selectively connect and/or disconnect the portable computers from the docking station.

13. A portable computer, comprising:
a transceiver for sending an access signal and receiving an acknowledge signal;
wherein said portable computer initiates wireless communication when a signal strength of said acknowledge signal exceeds a predetermined amount; and
wherein said portable computer terminates said wireless communication via a graphical user interface or priority of another wireless communication exclusive of the portable computer.

14. A method for initiating and terminating wireless communication between portable computers and docking stations, comprising:
moving a first portable computer toward a first docking station;
detecting a signal strength of an acknowledge signal sent from the first docking station;
initiating a wireless communication link between the first portable computer and the first docking station when the signal strength exceeds a predetermined amount;
moving a second portable computer toward the first docking station;
sending an access signal from the second portable computer that includes a priority number assigned to the second portable computer; and
terminating the wireless communication link between the first portable computer and the first docking station if the priority number assigned to the second portable computer is higher than a priority number assigned to the first portable computer, wherein if the wireless communication link between the first portable computer and the first docking station is terminated, the method further comprises:
detecting a signal strength of a second acknowledge signal sent from the first docking station; and initiating a wireless communication link between the second portable computer and the first docking station when the signal strength exceeds a predetermined amount.

15. The method as recited in claim 14, further comprises:

moving the first portable computer away from the first docking station and toward a second docking station;

terminating the wireless communication link between the first portable computer and the first docking station when the signal strength of the acknowledge signal sent from the first docking station is less than the predetermined amount;

detecting a signal strength of a second acknowledge signal sent from the second docking station; and initiating a wireless communication link between the first portable computer and the second docking station when the signal strength of the second acknowledge signal exceeds the predetermined amount.

\* \* \* \* \*